United States Patent Office 3,377,197
Patented Apr. 9, 1968

3,377,197
FLUORINE - ORGANOMETALLIC COMPOUNDS, PROCESS OF PREPARING SAID COMPOUNDS, AND PROCESS OF TREATING SOLID MATERIAL WITH SAID COMPOUNDS
William A. Erby, Alburtis, and Richard A. Flinn and Robert A. Walde, Emmaus, Pa., assignors to Air Products and Chemicals, Inc., Philadelphia, Pa., a corporation of Delaware
No Drawing. Filed July 30, 1964, Ser. No. 386,436
24 Claims. (Cl. 117—121)

ABSTRACT OF THE DISCLOSURE

Novel fluorine-organometallic compounds are prepared by reaction of an organo-metallic compound with 0.5 to 2.0 mols of a fluorinated organic acid in an organic solvent. Applied to textile fibres or other solid water-insoluble materials such as paper, wood, glass or ceramic clays, these compounds impart resistance against soiling, staining and wetting. The starting fluorine reactant is a compound of the formula:

$$C_nF_{2n+1}CHOHCH_2COOH$$

or $$C_nF_{2n+1}CONH(CH_2)_xCOOH$$

wherein $n$ is 1 to 20 and $x$ is 1 to 10. Examples of such preferred compounds are perfluoro-octanoyl glycine and beta-hydroxy-beta perfluoroheptylpropionic acid. The organo-metallic reactant is one corresponding to the structure $$M\ R'(R)_d$$

in which M is preferably aluminum but may be another metal such as: boron, cadmium, gallium, magnesium, thallium or zinc; R' is an alkyl radical of 1 to 8 carbon atoms, R may be hydrogen, halogen or an alkyl radical of up to 8 carbon atoms, $d$ is equal to the valence of the metal (M) minus one. Representative of preferred organo-metallic reactants are: triisobutyl aluminum and triethylaluminum.

---

This invention relates to novel fluorine-organometallic compounds and to the use of these compounds for the treatment of solid materials to impart effective resistance to soiling, staining and wetting by both water and oil-borne materials.

The expression "solid materials," as employed herein, includes cellulosic, proteinaceous, synthetic and other water-insoluble materials customarily employed in the manufacture of textile fabric, textile yarn, leather, paper, plastic sheeting, wood, glass and ceramic clays as well as manufactured articles prepared therefrom such as articles of apparel, wallpaper, paper bags, cardboard boxes, porous earthenware, etc.

Heretofore, organo polysiloxanes have been used extensively in the treatment of such materials, particularly those of a cellulosic nature, to render them water-repellent. While these prior art compositions perform an outstanding job for their intended use, they have been somewhat deficient in their total effectiveness. Thus, while prior art organo polysiloxanes have rendered fabrics more or less resistant to moisture, they have not had as high an oil repellency as desired and they have not rendered the fabric soil repellent.

Similarly, many fluorinated compounds suggested for imparting stain and wetting resistance to fabrics have been found deficient in their dry soil repellent characteristics. In fact, some of the commercial fluorinated compounds utilized for fabric treatment not only fail to repel dry soil but actually attract and hold such soil.

It is an object of the present invention to provide novel fluorine-organometallic compounds and to provide a method for their preparation. Another object is to provide a means of imparting resistance towards wetting by water and oil, staining by water and oil-borne stains and soiling by dry soil to solid materials by applying said fluorine-organometallic compounds to the materials using conventional techniques such as padding, dipping, impregnation, spraying, etc.

The novel compounds of this invention are represented by the formula $(R_fY)_aM(R')_b(R)_c$, where $R_f$ is the perfluorinated organic group $C_nF_{2n+1}$, Y represents the functional group $CHOHCH_2COO$ or $CONH(CH_2)_xCOO$, M is a metal, R and R' are organic groups forming a carbon to metal bond which are hydrolytically and/or oxidatively unstable, $a+b+c$ equal the valence of the metal M, $n$ is an integer of 1 to 20 but preferably above 3 and $x$ is an integer of 1 to 10. These compounds may be prepared by the reaction of a fluorinated organic acid with an organometallic compound in a solvent. The reaction is essentially instantaneous—going to completion at room temperature although elevated temperatures as high as 100° C. may be utilized.

The fluorinated organic acids employed for the reaction with the organometallic compounds have either the structure $C_nF_{2n+1}CHOHCH_2COOH$ or $$C_nF_{2n+1}CONH(CH_2)_xCOOH$$

where $n$ is an integer of 1 to 20 and $x$ is an integer of 1 to 10. Representative compounds include beta-hydroxy-beta-perfluoromethylpropionic acid; beta - hydroxy - beta - perfluoroheptylpropionic acid; beta - hydroxy - beta - perfluorotetradecylpropionic acid; beta - hydroxy - beta - perfluoroeicosylpropionic acid; perfluoroethanoylamino acetic acid; perfluorooctanoylaminoacetic acid; perfluorobutanoylaminopropionic acid; perfluorooctanoylaminopropionic acid, perfluorohexanoylaminobutyric acid; perfluoropentadecanoylaminobutyric acid; perfluoroundecanoylaminovaleric acid; perfluoroethanoylaminocaproic acid; perfluorobutanoylaminocaprylic acid and perfluoropentadecanoylaminocapric acid.

These compounds are synthesized from organic fluorine compounds presently being prepared by electrolytic fluorination. The basic starting material is perfluoroalkanoic acid which is subsequently converted to the acid chloride of the corresponding aldehyde. Compounds of the formula $C_nF_{2n+1}CHOHCH_2COOH$ may be prepared by reacting the aforementioned aldehyde with malonic acid while compounds of the formula $$C_nF_{2n+1}CONH(CH_2)_xCOOH$$

are prepared by reacting the aforementional acid chloride with an amino carboxylic acid.

The organometallic compounds used for reaction with the fluorinated organic acids are compounds having covalent metal carbon bonds which are oxidatively or hydrolytically unstable which compounds have the general structure $MR'(R)_d$ wherein M is aluminum, R is selected from hydrogen, halogen and alkyl radicals of 1 to 8 carbon atoms, R' is selected from alkyl radicals of 1 to 8 carbon atoms and $d$ is a number equal to the valence of the metal M minus 1. Representative compounds include monoethyl aluminumdihydride, trimethyl aluminum, triethyl aluminum-diethyl aluminum hydride mixtures, trioctyl aluminum, dibutyl aluminum fluoride, ethyl aluminum dichloride, methyl aluminum sesquichloride, diethyl aluminum bromide, triethyl-trimethyl aluminum mixtures, dimethyl benzyl aluminum, triphenyl aluminum, etc., which are prepared in known manner.

Metals other than aluminum which may be utilized in the preparation of organometallic compounds include boron, cadmium, gallium, magnesium, thallium and zinc.

These metals, however, are not necessarily as effective as aluminum.

When preparing the novel fluorine-organometallic compounds of this invention, the fluorinated organic acid compounds are reacted with the organometallic materials in a molar ratio of 0.5:1 to 2:1 and preferably 0.8:1 to 1.5:1 in a solvent such as heptane, ethylacetate, ethylether, etc. It is important that the reaction be carried out in a system essentially free from oxygen and water.

After the reaction is completed, the resulting product has a structure $$(R_fY)_aM(R')_b(R)_c$$

corresponding or intermediate to the formula $$C_nF_{2n+1}CHOHCH_2COOMR'R$$

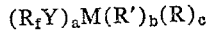

$$[C_nF_{2n+1}CHOHCH_2COO]_2MR'$$

$$C_nF_{2n+1}CONH(CH_2)_xCOOMR'R$$

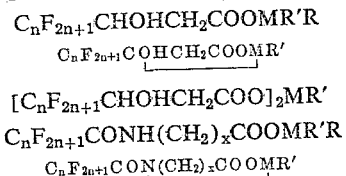

and $[C_nF_{2n+1}CONH(CH_2)_xCOO]_2MR'$, where $n$ is an integer of 1 to 20, $x$ is an integer of 1 to 10, R is either hydrogen, halogen or an alkyl radical having 1 to 8 carbon atoms and R' is an alkyl radical of 1 to 8 carbon atoms, may be applied to solid materials, as herein defined, with or without the presence of additional surfactants, dispersants, propellants, (e.g., nitrous oxide, propane, butane, carbon dioxide), etc., by padding, dipping, impregnation, spraying, etc. Spraying from an aerosol container or a spray gun are desirable methods of application since contact of the treatment chemical with the atmosphere is prevented prior to actual application.

Concentration of the active ingredients to the solid materials such as cotton and similar diaphanous fabrics in the range of 0.10 to 10 percent by weight and preferably in the range of 1 to 5 percent by weight have been found to give excellent and unique repellent properties—particularly to dry soiling. For rugs, leather, etc., the aforementioned repellent properties have been obtained when the active ingredients are added in the range of 0.05 to 5.0 grams/ft.² and preferably 0.1 to 1.0 grams/ft.². The treatment material is rendered insoluble on the solid material as well as resistant to removal by abrasion upon exposure to active hydrogen atoms such as those contained in the hydroxyl and amine functionality of the solid material, moisture contained in the solid material, the oxygen in the air, and/or moisture in the air. Treatment of the solid materials by the indicated means and in the aforementioned concentrations not only imparts resistance to soiling, staining and wetting by both water and oil-borne substances but imparts such resistance without being detected by either casual observation or feel.

While the examples illustrate the nature of the present invention, the invention is not intended to be limited to these specific embodiments. Parts are by weight unless otherwise indicated.

EXAMPLE I

The compound beta-hydroxy-beta-perfluoroheptylpropionic acid was prepared by the following procedure.

20 grams of perfluorooctanal and 10 milliliters of toluene were added to a cold solution of 6.0 grams of malonic acid in 30 milliliters of pyridine. This mixture was heated at 115° C. until the evolution of CO₂ ceased. The reaction mixture was then cooled and poured into a slurry of 13 milliliters of concentrated sulfuric acid and 100 grams of chipped ice. The organic layer was taken up in ether. The ether solution was washed with two 50-milliliter portions of water, dried over sodium sulfate and concentrated under vacuum until crystals of beta-hydroxy-beta-perfluoroheptylpropionic acid began to appear. The residue, on crystallization from a mixture of 15 grams of ether and 85 grams of heptane, yielded 22 grams of pure beta-hydroxy-beta-perfluoroheptylpropionic acid (melting point 124° C.) corresponding to a 98% yield.

EXAMPLE II

The compound perfluorooctanoyl glycine was prepared by the following procedure.

A suspension of 150 grams of glycine in a solution of 150 grams of perfluorooctanoyl chloride and 300 ml. of ethyl acetate was heated at the reflux temperature, 98° C. until the evolution of hydrochloric acid was complete. The reaction mixture was then filtered and the filter cake washed with three 100 milliliter portions of warm ethyl acetate. The combined organic layers were concentrated at 80° C. under vacuum to a viscous oil which solidified on cooling. The waxy solid of crude perfluorooctanoyl glycine was washed with dry heptane to remove unreacted perfluorooctanoyl chloride and residual solvent. It was then air-dried and recrystallized from a mixture of heptane and ethyl ether to give 152 grams of white solid product corresponding to a 94% yield.

Several tests have been developed in order to evaluate the effectiveness of compounds capable of imparting repellent properties to solid materials. These tests include:

(a) Water repellency
(b) Oil repellency
(c) Stain resistance
(d) Dry soil repellency
(e) Hydrolytic stability All of these tests are standard commercial procedures with the exception of the hydrolytic stability test which was developed by Air Products and Chemicals, Incorporated.

(A) Water repellency (ASTM D583–58)

This test (known as the "water spray test") demonstrates how a treated fabric resists wetting under mild impact of water droplets.

Equipment.—A six-inch diameter funnel, ring stand, spray nozzle (19 holes, drill No. 65, 35/1000-inch diameter), metal embroidery hoop (six-inch diameter), sample holder block to hold sample at 45° to the horizontal and 250 cc. of distilled water. Procedure:

A 7 x 7-inch sample of the treated fabric is placed in the embroidery hoop. The hoop is placed under the spray head at a 45° angle, so that the center of the hoop is 6 inches from the head and the center of the spray pattern will coincide with the center of the hoop. A 6-inch laboratory funnel is attached to the spray head to act as a reservoir. 250 milliliters of distilled water is then poured into the funnel. At the completion of the spray period, one edge of the hoop is held and tapped smartly once against a solid object. The wetted fabric is then compared with a standard chart or the verbal description below.

Standard spray test ratings (resistivity)

100—No sticking or wetting of upper surface
90—Slight random sticking or wetting of upper surface
80—Wetting of upper surface at spray points
70—Partial wetting of whole upper surface
50—Complete wetting of whole upper surface
0—Complete wetting of whole upper and lower surfaces (B) Oil repellency This test is based on the different penetrating properties of two hydrocarbon liquids, mineral oil and n-heptane. Mixtures of these two liquids are miscible in all proportions and show penetrating properties proportional to the n-heptane content of the mixture.

The oil repellency rating numbers below correspond with the A.A.T.C.C. Standard Spray Ratings which are now in use for testing water repellent finishes.

COMPOSITION OF LIQUID MIXTURES
FOR THE OIL REPELLENCY TEST

| Percent Mineral Oil | Percent N-heptane | Oil Repellency Rating |
|---|---|---|
| 0 | 100 | 150 |
| 10 | 90 | 140 |
| 20 | 80 | 130 |
| 30 | 70 | 120 |
| 40 | 60 | 110 |
| 50 | 50 | 100 |
| 60 | 40 | 90 |
| 70 | 30 | 80 |
| 80 | 20 | 70 |
| 90 | 10 | 60 |
| 100 | 0 | 50 |
| (*) | | 0 |

*No holdout to mineral oil.

To measure oil repellency of a treated fabric, 8″ x 8″ swatches are placed flat on a table. The test mixtures are contained in small dropping bottles with ground-in pipettes. A drop of each mixture is gently placed (not dropped) onto the surface of the fabric, preferably in two different portions of the test samples. After three minutes, the degree of wetting and penetration of the fabric are observed.

From the above table, the number corresponding to the mixture containing the highest percent heptane which does not penetrate or wet the fabric after three minutes contact is considered the oil repellency rating of the specimen.

Usually, acceptable ratings are 90 and above, although beneficial effect to oil staining is sometimes obtained with ratings as low as 50.

(C) Stain resistance

This test illustrates the effectiveness of treated fabrics to resist such typical water-based stains as ink, wine, catsup, etc., as well as such typical oil-based stains as cooking oils, lube oil, or mayonnaise, etc.

(1) Test stains:
 Corn oil (Mazola corn oil)
 Permanent black ink (Sheaffer's "Skrip" ink #22)
 Carbon black in corn oil
 Catsup
 Wine—20% alcohol
 After-shave lotion (Aqua Velva)
 Specimen: at least 2 x 5-inches for each stain.
(2) Procedure:
 (a) 3 or 4 drops of stain are dropped from an eye dropper at a 6-inch height onto the test sample
 (b) Using clean absorbent tissue all droplets of stain are carefully blotted
 (c) The samples are evaluated on the basis of the stain left after blotting. They are given 1 to 5 points, the lowest value for the best stain resistance:
  (1) Very good
  (2) Good
  (3) Satisfactory
  (4) Bad
  (5) Very bad (D) Dry soil repellency This test evaluates the dry soil stain resistance of treated fabrics. For a practical evaluation comparisons are made between the treated and untreated fabric.

FORMULA FOR A STANDARD SYNTHETIC DRY SOIL

| Ingredient: | Percent by weight |
|---|---|
| Peat moss (dry) | 38 |
| Cement | 17 |
| Kaolin clay | 17 |
| Silica | 17 |
| Furnace black | 1.75 |
| Red iron oxide | 0.50 |
| Mineral oil | 8.75 |

The test consists of pouring a small quantity of the above soil mixture into a paper bag with 4″ x 4″ samples of the fabric. The bag is then shaken vigorously for one minute, the contents dumped out and the samples brushed smartly several times on each side with the finger tips. Comparison of dry soiling can be made by the visual examination of the treated and untreated samples, and numerically evaluated in the same manner as the aforementioned stain resistance test.

(E) Hydrolytic stability

This test determines the hydrolytic stability properties of treated fabrics.

Equipment:
 (a) 6-inch long, 1-inch I.D. calibrated Plexiglas tube and holding ring
 (b) 600 ml. beaker
 (c) Stopwatch
Specimens:
 0.7854 sq. inch area of the test sample
Test solutions:
 400 ml. soln. with pH 2
 400 ml. soln. with pH 11
 400 ml. soln. with pH 9 (1% tide soln.)
 400 ml. soln. with pH 7 (water)

Procedure.—Treated fabric samples are fastened to one end of the Plexiglas tube and placed in the test solution to a depth of 6 inches. The time it takes for the liquid level inside the tube to reach the 25 ml. mark on the Plexiglas tube is recorded. From the average time of three runs, the rate of penetration of the test solution through the fabric samples is calculated and reported as milliliters of the test solution per minute per square inch.

The following examples demonstrate the preferred procedure for preparing the fluorine-organometallic compounds of the present invention and the advantageous use of these compounds for treating solid materials.

EXAMPLE III 1.03 ml. of diethyl zinc was dissolved in 50 ml. of ethyl acetate. To this solution there was slowly added 30 cc. of ethyl acetate containing 2.25 grams of perfluorooctanoyl glycine (prepared in accordance with Example II). The mixture was placed in an aerosol can with 50 grams of Freon 12 and sprayed on to a cotton cloth. Examination of the treated cloth showed it to have an oil rating of 100, a water repellency of 80 and a dry soil repellency of 1.

EXAMPLE IV 2.3 grams of perfluorooctanoyl glycine was dissolved in 50 milliliters of ethyl acetate. The resulting solution was slowly added, with stirring at room temperature, to 1.25 milliliters of triisobutyl aluminum dissolved in 50 milliliters of ethyl acetate. All of the operations were carried out under nitrogen and in dry solvents. After 15 minutes, the mixture was cooled and sealed in an aerosol can with 300 milliliters of Freon 12.

The can was allowed to warm to room temperature and part of the contents sprayed on cotton cloth. The treated cloth gave a water spray rating of 100, an oil repellency rating of 130 and a soil index of 1.3.

For comparative purposes Zepel, an aqueous emulsion of fluorocarbons, was applied to a cotton fabric in a 3% concentration. The treated cloth gave a water spray rating of 90, an oil repellency rating in the range of 120 and a soil repellency index of 2.5.

EXAMPLE V

Following the general procedure of Example IV, a number of other compounds were prepared. The following table lists the reactants and sets forth the properties imparted to cotton cloth by the reaction products.

| Perfluorinated Acid | Aluminum Alkyl | Water Spray Rating | Oil Repellency Rating |
|---|---|---|---|
| 2.2 gm. $C_7F_{15}CHOHCH_2COOH$ | 0.7 ml. TEA | 90+ | 100 |
| 2.2 gm. $C_7F_{15}CHOHCH_2COOH$ | 1.25 ml. TIBA | 70 | 90 |
| 2.3 gm. $C_7F_{15}CONHCH_2COOH$ | 0.7 ml. TEA | 90 | 100 |

TEA = triethylaluminum (spg. 0.832).
TIBA = triisobutyl aluminum (spg. 0.787).

EXAMPLE VI

The following example demonstrates the application of the repellent treatment using a compressed gas spray gun. 3.4 ml. of triethyl aluminum was dissolved in 300 ml. of ethyl acetate. To this solution there was added 300 ml. of ethyl acetate containing 11.8 grams of perfluorooctanoyl glycine. The resulting mixture was stirred for several hours and transferred, under nitrogen, to a spray gun reservoir. The solution was then sprayed onto cloth using 30 p.s.i.g. of dry nitrogen pressure. The solution pick-up of the cloth was approximately 100 weight percent and the treated cloth showed the following properties: oil repellency—140, water repellency—100 and a dry soil repellency of 1.5.

EXAMPLE VII

A preferred composition for application to rayon fabrics comprises 60% ethylacetate, 5% n-heptane, 2% $C_7F_{15}CONCH_2COOAl(C_4H_9)_2$ and 35% Freon propellent. This composition results in a stable product with good appearance when sprayed on the rayon cloth and exhibits a 90 water spray rating, a 110 oil repellency and a soil index of 1.8 out of 5.

Similar results were obtained when the heptane concentration was increased to 10% and the ethylacetate decreased to 55%.

EXAMPLE VIII

To determine the compatability of the fluorinated acid-organometallic compounds of the present invention with various solvents, a solution was prepared by dissolving 18.8 grams of perfluorooctanoyl glycine in 100 milliliters of the ethyl acetate. This solution was slowly added to 18.8 grams of perfluorooctanoyl glycine in 100 milliliters of ethyl acetate and the mixture stirred for one-half hour. 20 milliliter aliquots of this solution were then diluted to 100 milliliters with various combinations of solvents as shown in the following table.

| Run No. | Gm. of stock soln. | Gm. of Ethyl Acetate | Gm. of Heptane | Gm. of Freon 12 | W.S. (a) | Oil (b) | Soil (c) |
|---|---|---|---|---|---|---|---|
| 1 | 20 | | 40 | 40 | 80 | 110 | 1.6 |
| 2 | 20 | 10 | 30 | 40 | 80 | 110 | 1.8 |
| 3 | 20 | 20 | 20 | 40 | 80 | 120 | 2.0 |
| 4 | 20 | 30 | 10 | 40 | 80 | 120 | 2.0 |
| 5 | 20 | | ¹40 | 40 | 80 | 120 | 2.0 |
| 6 | 20 | 30 | ¹10 | 40 | 80 | 120 | 2.0 |
| 7 | 20 | | ²40 | 40 | 80 | 120 | 1.8 |
| 8 | 20 | 30 | ²10 | 40 | 90 | 120 | 1.8 |
| 9 | 20 | | ³40 | 40 | 80 | 110 | 1.8 |
| 10 | 20 | 30 | ³10 | 40 | 80 | 110 | 2.0 |

¹ Gm. of Freon 114B2.
² Gm. of Acetone.
³ Gm. of Methyl Ethyl Ketone.
(a) Standard water spray test (ASTM D583–58).
(b) Oil repellency test.
(c) An index of qualitative evaluation of all the soil tests obtained by averaging five tests: dry soil, oil, catsup, ink and wine. Stained samples were rated from one (best) to five (worst). Scotchgard FC-208, at 3% concentration, scored 2.6 on this basis and untreated fabric 5.0.

EXAMPLE IX

The following data demonstrate the outstanding effectiveness of this disclosed fluorinated acid-organometallic compounds for treating solid materials to render them soil and stain repellent. For a quantitative evaluation and comparison, data for Scotchgard FC–208, an aqueous emulsion of fluorocarbon, at 3% concentration has also been set forth in Run 2. The Scotchgard was added using the standard technique for this material, i.e., by padding from an aqueous emulsion. The leather and cotton samples of Runs 4 and 5 were treated with $$C_7F_{15}CONHCH_2COOAl(C_4H_9)_2$$

at a 2 weight percent concentration based on the weight of ethyl acetate solvent and Freon propellent by spraying the samples from an aerosol can. The results are of particular importance since most of the non-accidental soil is of the dry type.

| Run | Substance | A | B | C | D | E | F | G | Avg. |
|---|---|---|---|---|---|---|---|---|---|
| 1 | Blank Cotton | 5 | 5 | 5 | 5 | 5 | 5 | 5 | 5.00 |
| 2 | FC-208 on cotton | 2 | 3 | 2 | 2 | 1 | 1 | 5 | 2.28 |
| 3 | Blank Leather | 5 | 5 | 5 | 3 | 5 | 5 | 4 | 4.57 |
| 4 | Treated Leather | 1 | 1 | 4 | 1 | 1 | 1 | 1 | 1.43 |
| 5 | Treated Cotton | 1 | 3 | 2 | 1 | 1 | 1 | 1 | 1.86 |

A = Mazola Corn Oil.
B = Sheaffer's Skrip Ink.
C = Carbon Black in Corn Oil.
D = Catsup.
E = Wine—20% alcohol.
F = Aqua Velva.
G = Dry soil.

Rating Table:
1 = Very good.
2 = Good.
3 = Satisfactory.
4 = Bad.
5 = Very bad.

EXAMPLE X

To further demonstrate soil repellent characteristics, a composition composed of 60% ethyl acetate, 5% n-heptane, 2% ethyl aluminum perfloroheptylglycamide and 35% Freon propellent was packaged in an aerosol container.

This composition resulted in a stable product with good appearance on cloth and exhibited a 90% water spray rating, an oil repellency of 110 and a soil index of 1.8 out of 5. Cotton and wool carpeting sprayed in various patterns with the composition were exposed to continuous traffic for two days and vacuum cleaned. The areas in which no treatment was applied were noticeably quite dirty while the treated area showed little soiling—clearly indicating the beneficial results to be gained by the addition of the compositions of the present invention to items such as carpeting in order to prevent their soiling under normal use conditions.

EXAMPLE XI

The data of the following table demonstrate the effect of structural modifications on hydrolytic stability. Cotton cloths were treated with the compounds listed in the following table by padding, air drying and ironing.

The anhydrous aluminum tristearate was made by reacting one mol of triethyl aluminum with three mols of stearic acid in toluene and refluxing for 15 minutes. The solution was diluted to contain 10% of the aluminum salt. Diethyl aluminum stearate was similarly prepared by reacting one mole of triethyl aluminum with one mol of stearic acid in toluene and diluting the mixture to give a 10% solution.

By comparing the results obtained, particularly in Runs 3, 4, 5 and 6, it can be seen how the stability of the perfluorinated acid aluminum bond is greatly improved by introducing insulating methylene groups and secondary complexing groups.

| Runs | Compound | Hydrolysis Rate (cc./min./in.²) | | | |
|---|---|---|---|---|---|
| | | pH 2 | pH 11 | 1% Tide | pH 7 |
| 1 | $(C_{17}H_{35}COO)_3Al$ | 3.1 | 5.39 | 0.26 | 5.1 |
| 2 | $C_{17}H_{35}COOAl(C_2H_5)_2$ | 6.99 | 23.4 | 3.60 | 0.4 |
| 3 | $C_7F_{15}COOAl(C_2H_5)_2$ | 18 | 120 | 6.0 | 0.3 |
| 4 | $C_7F_{15}CONHAl(C_2H_5)_2$ | 100 | 18 | 4.8 | 7.2 |
| 5 | $C_7F_{15}COHCH_2COOAl(C_2H_5)_2$ | 0 | 0 | 0.7 | 0 |
| 6 | $C_7F_{15}CONHCH_2COOAl(C_2H_5)_2$ | 0 | 4.9 | 1.15 | 0 |

Obviously, many modifications and variations of the invention as hereinbefore set forth may be made without departing from the spirit and scope thereof and therefore only such limitations should be imposed as are indicated in the appended claims.

What is claimed is:

1. A fluorine-organometallic compound of the formula $(R_fY)_aM(R')_b(R)_c$ wherein $R_f$ is the perfluorinated organic group $C_nF_{2n+1}$; Y is a functional member selected from the group consisting of $CHOHCH_2COO$ and $$CONH(CH_2)_xCOO$$

M is a metal selected from the group consisting of aluminum, boron, cadmium, gallium, magnesium, thallium and zinc; R is a member selected from the group consisting of hydrogen, halogen and alkyl radicals of 1 to 8 carbon atoms; R' is an alkyl radical of 1 to 8 carbon atoms; $a$, $b$ and $c$ are integers the sum of which equals the valence of the metal M, $a$ and $b$ each being equal to at least one; $n$ is an integer of 1 to 20 and $x$ is an integer of 1 to 10.

2. A compound having the formula $$C_nF_{2n+1}CHOHCH_2COOAlR'R$$

wherein $n$ is an integer of 3 to 20, R is selected from the group consisting of hydrogen, halogen and alkyl radicals having 1 to 8 carbon atoms and R' is an alkyl radical of 1 to 8 carbon atoms.

3. A compound according to claim 2 wherein $n$ is 7, R is $C_2H_5$ and R' is $C_2H_5$.

4. A compound according to claim 2 wherein $n$ is 7, R is $C_4H_9$ and R' is $C_4H_9$.

5. A compound having the formula $$C_nF_{2n+1}CONH(CH_2)_xCOOAlR'R$$

wherein $n$ is an integer of 3 to 20, $x$ is an integer of 1 to 10, R is selected from the group consisting of hydrogen, halogen and alkyl radicals having 1 to 8 carbon atoms and R' is an alkyl radical of 1 to 8 carbon atoms.

6. A compound according to claim 5 wherein $n$ is 7, $x$ is 1, R is $C_2H_5$ and R' is $C_2H_5$.

7. A compound according to claim 5 wherein $n$ is 7, $x$ is 1, R is $C_4H_9$ and R' is $C_4H_9$.

8. A compound having the formula

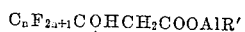

wherein $n$ is an integer of 3 to 20 and R' is an alkyl radical of 1 to 8 carbon atoms.

9. A compound having the formula

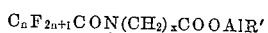

wherein $n$ is an integer of 3 to 20, $x$ is an integer of 1 to 10 and R' is an alkyl radical of 1 to 8 carbon atoms.

10. A compound having the formula $$[C_nF_{2n+1}(CHOHCH_2COO]_2AlR'$$

wherein $n$ is an integer of 3 to 20 and R' is an alkyl radical of 1 to 8 carbon atoms.

11. A compound having the formula $$[C_nF_{2n+1}CONH(CH_2)_xCOO]_2AlR'$$

wherein $n$ is an integer of 3 to 20, $x$ is an integer of 1 to 10 and R' is an alkyl radical of 1 to 8 carbon atoms.

12. A process for preparing a fluorine-organometallic compound which comprises reacting (A) a fluorinated organic acid having a structural formula from the group consisting of $$C_nF_{2n+1}CHOHCH_2COOH$$

and $C_nF_{2n+1}CONH(CH_2)_xCOOH$, wherein $x$ is an integer of 1 to 10 and $n$ is an integer of 1 to 20, with (B) an organometallic compound having the structure $MR(R')_d$ wherein M is a metal selected from the group consisting of aluminum, boron, cadmium, gallium, magnesium, thallium, and zinc, R is a member selected from the group consisting of hydrogen, halogen and an alkyl radical having 1 to 8 carbon atoms, R' is an alkyl radical having 1 to 8 carbon atoms and $d$ is an integer equal to the valence of the metal M minus one, in a molar ratio of 0.5:1 to 2:1 in the presence of a solvent.

13. The process of claim 12 wherein the solvent is ethylacetate.

14. A process for preparing a fluorine-organometallic compound which comprises reacting a fluorinated organic acid having the structure $C_nF_{2n+1}CHOHCH_2COOH$ wherein $n$ is an integer of 1 to 20 with an aluminum alkyl having the structure $AlR(R')_2$ wherein R is selected from the group consisting of hydrogen, halogen and alkyl radicals of 1 to 8 carbon atoms and R' is an alkyl radical of 1 to 8 carbon atoms in a molar ratio of 0.5:1 to 2:1 in the presence of a solvent.

15. The process of claim 14 wherein the solvent is ethyl acetate.

16. A process for preparing a fluorine-organometallic compound which comprises reacting a fluorinated organic acid having the structure $C_nF_{2n+1}CONH(CH_2)_xCOOH$ wherein $n$ is an integer of 1 to 20 and $x$ is an integer of 1 to 10 with an aluminum alkyl having the structure $AlR(R')_2$ wherein R is selected from the group consisting of hydrogen, halogen and alkyl radicals of 1 to 8 carbon atoms and R' is an alkyl radical having 1 to 8 carbon atoms in a molar ratio of 0.5:1 to 2:1 in the presence of a solvent.

17. The process of claim 16 wherein the solvent is ethylacetate.

18. The process of treating a solid material to impart resistance to soiling, staining and wetting, which comprises contacting said solid material with a compound formed by the reaction of perfluorooctanoyl glycine with 0.5 to 2.0 mols of trialkylaluminum, so as to deposit said compound on the material and allowing the material to dry.

19. The process of claim 18 wherein the solid material is selected from the group consisting of cellulosic and proteinaceous materials.

20. The process of claim 18 wherein the trialkylaluminum compound is triethylaluminum.

21. The process of treating a solid material from the group consisting of cellulosic and proteinaceous materials to impart resistance to soiling, staining and wetting which comprises contacting said solid material with a compound formed by the reaction of beta-hydroxy-beta-perfluoroheptylpropionic acid with 0.5 to 2.0 mols of trialkylaluminum, so as to deposit said compound on the material and allowing the material to dry.

22. The process of claim 21 wherein the trialkylaluminum compound is triisobutylaluminum.

23. The process of claim 21 wherein the trialkylaluminum compound is triethylaluminum.

24. The process of treating a solid material to impart resistance to soiling, staining and wetting, which comprises contacting said solid material with a compound formed by the reaction of (A) a fluorinated organic acid having a structural formula from the group consisting of $$C_nF_{2n+1}CHOHCH_2COOH$$

and $C_nF_{2n+1}CONH(CH_2)_xCOOH$, wherein $x$ is an integer of 1 to 10 and $n$ is an integer of 1 to 20, with (B) 0.5 to 2.0 mols of an organometallic compound selected from the group consisting of triphenyl aluminum, dimethylbenzyl aluminum and compounds having the structure $MR(R')_d$ wherein M is a metal selected from the group consisting of aluminum, boron, cadmium, gallium, magnesium, thallium, and zinc, R is a member selected from the group consisting of hydrogen, halogen and an alkyl radical having 1 to 8 carbon atoms, R' is an alkyl radical having 1 to 8 carbon atoms, and d is an integer equal to the valence of the metal M minus one.

References Cited

UNITED STATES PATENTS

| | | | |
|---|---|---|---|
| 2,567,011 | 9/1951 | Diesslin et al. | 260—465.7 |
| 2,662,835 | 12/1953 | Reid | 117—121 |
| 2,916,392 | 12/1959 | Chapin et al. | 117—167 X |
| 3,238,235 | 3/1966 | Hauptschein et al. | 260—408 X |
| 2,802,028 | 8/1957 | England | 260—539 |
| 2,806,867 | 9/1957 | Barnhart et al. | 260—408 |
| 2,823,144 | 2/1958 | Dalton | 117—121 |
| 3,088,958 | 5/1963 | Eleuterio | 260—438.5 |

WILLIAM D. MARTIN, *Primary Examiner.*

T. G. DAVIS, *Assistant Examiner.*

UNITED STATES PATENT OFFICE
CERTIFICATE OF CORRECTION

Patent No. 3,377,197                                      April 9, 1968

William A. Erby et al.

It is hereby certified that error appears in the above numbered patent requiring correction and that the said Letters Patent should read as corrected below.

Column 2, line 46, "of" should read -- or --. Column 3, line 18 "+" should read -- $\pm$ --; line 35, "Concentration" should read -- Concentrations --. Column 6, line 61, "300" should read -- 30 --. Column 7, line 44, cancel "the"; line 46, cancel "18.8 grams of perfluorooctanoyl glycine in 100 milliliters" and insert -- 10 milliliters of triisobutyl aluminum in 200 milliliters --. Column 8, line 60, "mole", first occurrence, should read -- mol --. Column 9, line 26, "seelcted" should read -- selected --.

Signed and sealed this 16th day of September 1969.

(SEAL)
Attest:

EDWARD M. FLETCHER, JR.                          WILLIAM E. SCHUYLER, JR.
Attesting Officer                                         Commissioner of Patents